United States Patent [19]
Sivy

[11] Patent Number: 4,845,151
[45] Date of Patent: Jul. 4, 1989

[54] THIXOTROPIC CYANOACRYLATE ADHESIVE COMPOSITION

[75] Inventor: George T. Sivy, Beverly, Mass.

[73] Assignee: Illinois Tool Works, Inc., Chicago, Ill.

[21] Appl. No.: 178,483

[22] Filed: Apr. 7, 1988

[51] Int. Cl.$^4$ .......................... C08K 3/36; C08K 5/06
[52] U.S. Cl. .................................... 524/762; 523/176; 523/212; 523/216; 524/376; 524/377; 524/555; 524/755; 524/757; 524/850
[58] Field of Search ............... 524/850, 555, 376, 377, 524/755, 762, 757; 523/176, 212, 216

[56] References Cited

U.S. PATENT DOCUMENTS

| | | | |
|---|---|---|---|
| 3,922,449 | 11/1975 | Bolger | 428/463 |
| 4,170,585 | 10/1979 | Motegi et al. | 428/451 |
| 4,377,490 | 3/1983 | Shirashi et al. | 526/212 |
| 4,477,607 | 10/1984 | Litke | 524/850 |
| 4,533,422 | 8/1985 | Litke | 524/850 |
| 4,686,247 | 8/1987 | Yosida | 523/213 |
| 4,713,405 | 12/1987 | Koga et al. | 524/850 |
| 4,720,513 | 1/1988 | Kameyama et al. | 523/213 |
| 4,764,545 | 8/1988 | Yosida | 524/850 |

FOREIGN PATENT DOCUMENTS

| | | | |
|---|---|---|---|
| 0063037 | 10/1982 | European Pat. Off. | 524/850 |
| 107993 | 8/1979 | Japan . | |
| 0012166 | 1/1980 | Japan | 524/850 |
| 2100567 | 5/1987 | Japan | 523/176 |

OTHER PUBLICATIONS

Derwent Abs 82-09423J/51, DE 3121139, Gruber et al, Dec. 1982.

Primary Examiner—Herbert J. Lilling
Attorney, Agent, or Firm—Herbert P. Price

[57] ABSTRACT

Adhesive compositions having improved stability and surface insensitivity are made from a blend of (a) a 2-cyanoacrylate ester adhesive, (b) a polyoxyalkylene glycol, glycol ester, or glycol ether, and (c) fumed silica having no surface treatment.

9 Claims, No Drawings

THIXOTROPIC CYANOACRYLATE ADHESIVE COMPOSITION

BACKGROUND OF THE INVENTION

The field of art to which this invention pertains is cyanoacrylate adhesives.

Alkyl 2-cyanoacrylates, or alpha-cyanoacrylic acid esters, polymerize at room temperature in the absence of added catalysts when pressed into a thin film between two adherends. The highly polar character of the formed polymers permits the formation of very strong bonds between a wide variety of materials.

In adhesive applications, alkyl 2-cyanoacrylates are polymerized by anionic mechanism. This anionic polymerization of alkyl 2-cyanoacrylates can be initiated even at low temperatures by very weak bases, such as water and alcohol. The bonding action observed when a cyanacrylate adhesive is placed between two adherends is the result of this anionic polymerization. The catalytic effect of minute amounts of water vapor or other weak bases is maximized by spreading the adhesive into a very thin film. The presence of basic substances accelerates the bonding action of the 2-cyanoacrylates, whereas the presence of acidic materials inhibits the polymerization and can even render the adhesive inactive. The set time (elapsed time after which two surfaces that have been pressed together can no longer be moved) for cyanacrylate adhesives varies from several seconds for glass to three minutes or longer for wood. The residual moisture in glass produces bonds having extremely rapid set times whereas the slight acidity in wood, as well as wood porosity, produces bonds having somewhat slower set times.

Various attempts have been made to shorten the setting time for 2-cyanoacrylate adhesives when used on acidic and/or porous surfaces. In U.S. Pat. No. 4,170,585, the setting time for 2-cyanoacrylate adhesives is accelerated by adding to the 2-cyanoacrylate (1) polyethylene glycols having a degree of polymerization of at least 3 and (2) non-ionic surface active agents having a poly(ethyleneoxy) moiety also having a degree of polymerization of at least three.

In U.S. Pat. No. 4,307,216, adhesive compositions made from 2-cyanoacrylate esters and monoacrylates of glycol monoethers are described.

2-Cyanoacrylate ester adhesives can be modified with diacrylic acid ethers of oxyethylene glycols as described in U.S. Pat. No. 3,692,752.

Aliphatic polyols, aliphatic polyether polyols, and derivatives thereof are used to modify 2-cyanoacrylate adhesives as described in U.S. Pat. No. 4,377,490.

Dicyanoacrylate esters of glycols and polyoxyethylene glycols are disclosed in British Pat. No. 1,048,906.

The 2-cyanoacrylate ester monomer is a low viscosity liquid which possess high flowability and can penetrate into very small gaps. However, this high flowability is a disadvantage when the adhesive is applied to vertical, inclined or porous surfaces. For such uses, the adhesive compositions have been thickened by various means. As described in Japanese Kokai No. 54-107,993, a number of compounds, such as polyols, e.g., sorbitol, polyethers, e.g., polyethylene glycol dilauryl ether, polypropylene glycol dioctyl ether, polyethylene glycol dimethacrylate, aluminum salts of aliphatic acids and silicon dioxides, e.g., silica gel, are disclosed which can be used to thicken cyanoacrylate adhesive compositions.

In U.S. Pat. No. 3,607,542, adhesive compositions which can be applied to surfaces submerged in water are made from 2-cyanoacrylate esters, fillers, e.g., calcium carbonate, barium carbonate and carbon black, and, as an optional component, fumed silica. Such pastes can be applied up to about four hours after the components are mixed together.

Thixotropic cyanoacrylate adhesives which are storage stable are made from the 2-cyanoacrylate monomer and fumed silicas which are surface treated with siloxanes or silanes as described in U.S. Pat. Nos. 4,477,607 and 4,713,405.

There is a continuing search for thixotropic cyanoacrylate adhesive compositions which are storage stable and which are rapidly curable on porous, inactive, or acidic surfaces.

SUMMARY OF THE INVENTION

This invention is directed to thixotropic adhesive compositions. In one aspect, this invention pertains to stable thixotropic 2-cyanoacrylate esters adhesives. In another aspect, this invention relates to stable, thixotropic 2-cyanoacrylate ester adhesives which are relatively surface insensitive and cure rapidly when applied to a variety of surfaces.

The adhesive compositions of this invention are made from (a) a 2-cyanoacrylate ester; (b) an alkylene or a polyoxyalkylene glycol, glycol ether, or glycol ester wherein the alkylene group contains 2 or 3 carbon atoms; and (c) fumed silica having no surface treatment.

DESCRIPTION OF THE INVENTION

The 2-cyanoacrylate esters useful in this invention are those having the formula

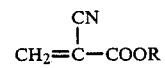

wherein R is a straight chain or branched chain alkyl group having 1 to 12 carbon atoms which can be substituted with a substituent such as a halogen atom or an alkoxy group, a straight or branched chain alkenyl group having 2 to 12 carbon atoms, a cycloalkyl group, an aralkyl group or an aryl group. Specific examples of such groups include methyl, ethyl, isopropyl, butyl, hexyl, lauryl, allyl, cyclohexyl, benzyl, phenyl, 2-chloroethyl, 2-methoxyethyl, and the like.

Particularly preferred cyanoacrylate esters are alkyl 2-cyanoacrylates wherein the alkyl group contains one to four carbon atoms.

The alkylene glycols useful in this invention are ethylene glycol and propylene glycol-1,2. The polyoxyalkylene glycols useful in this invention are polyoxyethylene gylcols and poly(oxypropylene-1,2) gylcols wherein the oxyalkylene group has a degree of polymerization of at least two. There polyoxyalkylene gylcols are made by polymerizing ethylene oxide and propylene oxide-1,2. Examples of such polyoxyalkylene glycols are diethylene glycol, dipropylene glycol, triethylene glycol, tripropylene glycol, tetraethylene glycol, tetrapropylene glycol, polyethylene glycols having molecular weights up to about 1000 and polyethylene glycols having molecular weights up to about 4000. Additional polyoxyalkylene glycols useful in this invention are block copolymers of ethylene oxide and propylene oxide-1,2 wherein the molar ratio of ethylene oxide to propylene oxide varies between 1:99 to 99:1. The molecular weights of the polyoxyalkylene glycols useful in this invention are limited by the solubility of the glycols in the cyanoacrylate monomer. Polyethylene glycols having molecular weighs up to about 600 and polypropylene glycols having molecular weights up to about 2000 are preferred.

The polyoxyalkylene glycol ethers useful in this invention are mono and di alkyl or aryl ethers of alkylene and polyoxyalkylene glycols having the same definition as defined hereinbefore. The alkyl groups are straight or branched chains having 1 to 18 carbon atoms, and the aryl groups are alkaryl or aralkyl groups having six to about 20 carbon atoms. Examples of suitable ethers are polyethylene glycol monomethyl ether, polypropylene glycol dimethyl ether, polyethylene glycol monobutyl ether, polypropylene glycol monolauryl ether, polypropylene glycol dimethyl ether, polyethylene glycol dipropyl ether, and the like.

Alkylene and polyoxyalkylene glycols esters useful in this invention are the mono and diacrylic or mono and dimethacrylic acid esters of alkylene and polyoxyalkylene glycols having the same definition as described hereinbefore.

The fumed silicas useful in this invention are those which have no surface treatment and which have a particle size of about 0.007 to 0.05 micrometers, a surface area of about 50–400 sq. meters/gram and a silica content of at least 99 percent. Fumed silicas are prepared by the following methods: (1) in high-temperature arc processes wherein silica is used as part of the electrodes and wherein the silica is vaporized and recondesnsed as a fine silica dust; (2) in plasma jet processes, wherein crystalline silica such as sand is fed directly to the high temperature plasma jet; (3) in flame-hydrolyic processes, wherein silicon tetrachloride is reacted with hydrogen and oxygen in a flame to form a very fine silica plus hydrochloric acid.

In preparing the compositions of this invention, the alkylene or polyoxyalkylene glycol compound is blended with the 2-cyanoacrylate ester monomer in the amount of about 0.05 to about 3 parts by weight based on 100 parts by weight of the 2-cyanoacrylate ester and preferably about 1 to about 2 parts by weight. The fumed silica is used in the amount of about 2 to about 10 parts by weight on the same basis and, preferably, about 3 to about 6 parts by weight.

Anionic polymerization inhibitors can be added to the adhesive compositions of this invention so as to increase the storage stability of the adhesive. Examples of such inhibitors are sulfur dioxide, aromatic sulfonic acids, aliphatic sulfonic acids, sultones, carbon dioxide, and the like. Such anionic polymerization inhibitors are used in the amount of about 5 to about 500 ppm based on the total weight of the adhesive.

Free radical polymerization inhibitors can also be added to the adhesive compositions of this invention in order to capture radicals which are formed in storage by light, heat or other means. Such inhibitors are the well known free radical polymerization inhibitors which are exemplified by hydroquinone and hydroquinone monomethyl ether. These inhibitors are added in the amount of about 500 to about 5000 ppm based on the total weight of the adhesive composition.

A thickener in addition to the fumed silica can also be added to the adhesive composition. Such thickeners are non reactive organic polymers which are soluble in the cyanoacrylate monomers. Examples of such thickeners are poly(methyl methacrylate), copolymers of methylmethacrylate with vinyl or acrylic monomers, acrylic rubbers, cellulose derivatives, and the like. The amount of thickener used is about 2 to about 20 parts by weight based on 100 parts by weight of the cyanoacrylate monomer.

Additional components which can be added to the adhesive compositions are plasticizers, perfumes, dyes, pigments and the like.

The adhesive compositions of this invention can be used to bond a variety of adherends, such as wood, chromate-treated metal surfaces as well as other metallic materials, ceramics, plastics, rubbers, leather, and paper.

The adhesive compositions of this invention have fast setting times and excellent storage stability as exhibited by a slow rate of syneresis.

The invention is described in more detail by the following examples. Parts, percentages and ppm (parts per million) are all by weight unless otherwise designated.

EXAMPLE 1

To a suitable container were added 88.9 parts of ethyl 2-cyanoacrylate and 15 ppm of sulfonic acid stabilizer. 5.66 parts of powered poly(methyl methacrylate), were then added and the mixture was gently heated and stirred until the polymer dissolved. 1.18 parts of polypropylene glycol dimethacrylate (M.W. 620) were then added. Fumed silica, 4.25 parts, was baked at 150° C. to dry it and was added hot to the blend. The resulting adhesive composition was a homogeneous, thixotropic gel having a viscosity (Brookfield HBT TA Spindle) at 10 rpm of 16,000 cps and at 1 rpm of 104,000, a viscosity index of 6.5. When applied to a vertical surface, a ⅛ inch bead did not flow on a vertical glass plate.

When stored at 82° C. in borosilicate glass tubes, the adhesive was stable exhibiting no thickening after more than 4 days and slight syneresis in 5 days.

The adhesive composition was applied to the following surfaces and the speed of the cure was measured.

| Balsa wood | 10–20 seconds |
| Cherry wood | 15–20 seconds |
| Ceramic | 25–30 seconds |
| Paper | 40–60 seconds |

EXAMPLE 2

An adhesive composition was formulated exactly as Example 1 except the polypropylene glycol dimethacrylate was left out. The properties of this composition compared to those of Example 1 are as follows:

|  | Example 1 | Example 2 |
| --- | --- | --- |
| Appearance | Homogeneous, thixotropic gel | Grainy paste |
| Stability in borosilicate glass tubes | Slight syneresis in 5 days | Severe Syneresis in less than 1 day |
| Flow on vertical glass plate | ⅛" bead does not flow | ⅛" bead flows |
| Speed of Cure |  |  |
| Balsa wood | 10–20 seconds | >1 minute |
| Cherry wood | 15–20 seconds | 30–60 seconds |
| Ceramic | 25–30 seconds | >>1 minute |

-continued

| | Example 1 | Example 2 |
|---|---|---|
| Paper | 40–60 seconds | >>1 minute |

EXAMPLE 3

Adhesive compositions were formulated using the same procedure and components as described in Example 1 except oxyethylene glycol dimethyacrylates having varying degrees of polymerization of the oxyethylene group were used. The formulations were left undisturbed for 5 days after which the amount of exuded liquid was a measured. These results are shown in the table. The degree of polymerization of the oxyethylene group $[CH_2 CH_2 O]_n$ is shown in the column under "n".

EXAMPLE 4

| Example | Glycol dimethacrylate Oxyethylene Unit | n | Amount of exudate % of formulation |
|---|---|---|---|
| 3A | ethylene | 1 | 1.00 |
| 3B | diethylene | 2 | 0.23 |
| 3C | triethylene | 3 | 0.24 |
| 3D | polyethylene | 10 | 0.04 |

Adhesive compositions were formulated using the procedure described in Example 1 except 0.2 part of 1,2-polyoxypropylene glycols of varying degrees of polymerization were used. The flow characteristics, as described in Example 2 were measured before and after 85 days aging under ambient conditions. Examples 4D and 4E were made with 1,3-propanediol using 0.2 part in 4D and 1.54 parts in 4E. These results were as follows:

| | | | ⅛ inch bead flow in 20 minutes | |
|---|---|---|---|---|
| Example | Glycol | n | Initial | 85 Days |
| A | Polypropylene | 34 | No flow | No flow |
| 4B | Polypropylene | 17 | No flow | No flow |
| 4C | Polypropylene | 12 | No flow | No flow |
| 4D | 1,3-Propanediol | 1 | Exudate flow | Severe exudate flow |
| 4E | 1,3-Propanediol | 1 | Slight | Severe exudate flow |

The principles preferred embodiments and modes of operation of the present invention have been described in the foregoing specification. The invention which is intended to be protected herein, however, is not to be construed as limited to the particular forms disclosed, since these are to be regarded as illustrative and changes may be made by those skilled in the art without departing from the spirit of the invention.

What is claimed:

1. An adhesive composition comprising:
   (a) a 2-cyanoacrylate ester;
   (b) an alkylene or a polyoxy alkylene glycol, an alkylene or a polyoxyalkylene glycol ether, or an alkylene or a polyoxy alkylene glycol ester wherein the polyalkylene group has a degree of polymerization of at least 2 and wherein the alkylene group is ethylene or propylene-1,2; and
   (c) fumed silica having no surface treatment, wherein (b) is present in the amount of about 0.05 to about three parts by weight based on 100 parts by weight of (a) and wherein (c) is present in the amount of about two to about ten parts by weight based on 100 parts by weight of (a).

2. The composition of claim 1 wherein (b) is present in the amount of about one to about two parts based on 100 parts by weight of (a) and wherein (c) is present in the amount of about three to about six parts by weight based on 100 parts by weight of (a).

3. The adhesive composition of claim 1 wherein (a) the 2-cyanoacrylate ester has the formula:

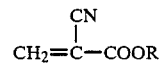

wherein R is a straight chain or branched chain alkyl group having 1 to 12 carbon atoms, a straight chain or branched claim alkyl group having halogen or alkoxy substituents, a cycloalkyl group, an aralkyl group, or an aryl group.

4. The composition of claim 3 wherein the R group is an alkyl group having 1 to 4 carbon atoms.

5. The composition of claim 4 wherein the alkyl group is ethyl.

6. The composition of claim 1 wherein the polyoxyalkylene glycol is polyethylene glycol having a molecular weight of about 106 to about 1000.

7. The composition of claim 6 wherein the upper molecular weight of the polyethylene glycol is about 600.

8. The composition of claim 1 wherein the polyoxyalklene glycol is poly(propylene-1,2) glycol having a molecular weight of about 130 to about 4000.

9. The composition of claim 8 wherein the upper molecular weight of the poly(propylene-1,2) glycol is about 2000.

* * * * *